(No Model.) 3 Sheets—Sheet 1.

E. E. RIES.
UNDERGROUND CONDUIT FOR ELECTRIC AND OTHER RAILWAYS.

No. 370,283. Patented Sept. 20, 1887.

ATTEST:
Percy C. Bowen
J. E. Moore

INVENTOR:
Elias E. Ries.
By Harding & Tichenor,
his Attorneys.

(No Model.) 3 Sheets—Sheet 2.
E. E. RIES.
UNDERGROUND CONDUIT FOR ELECTRIC AND OTHER RAILWAYS.
No. 370,283. Patented Sept. 20, 1887.

(No Model.) 3 Sheets—Sheet 3.
E. E. RIES.
UNDERGROUND CONDUIT FOR ELECTRIC AND OTHER RAILWAYS.
No. 370,283. Patented Sept. 20, 1887.
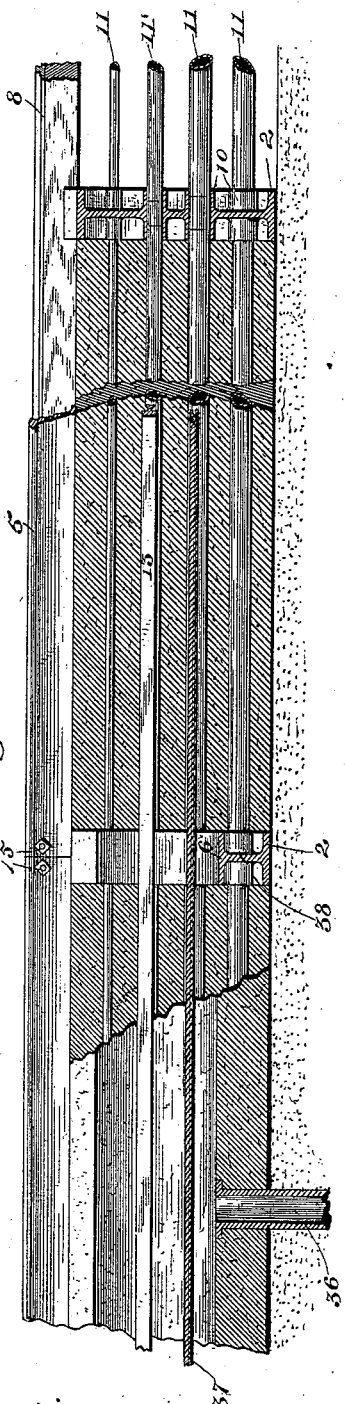

UNITED STATES PATENT OFFICE.

ELIAS E. RIES, OF BALTIMORE, MARYLAND, ASSIGNOR OF ONE-HALF TO ALBERT H. HENDERSON, OF SAME PLACE.

UNDERGROUND CONDUIT FOR ELECTRIC AND OTHER RAILWAYS.

SPECIFICATION forming part of Letters Patent No. 370,283, dated September 20, 1887.

Application filed April 29, 1887. Serial No. 236,546. (No model.)

*To all whom it may concern:*

Be it known that I, ELIAS E. RIES, a citizen of the United States, residing at Baltimore, in the State of Maryland, have invented certain new and useful Improvements in Underground Conduits for Electric and other Railways; and I do hereby declare the following to be a full, clear, and exact description of the invention, such as will enable others skilled in the art to which it appertains to make and use the same.

This invention relates to an underground conduit for the supply-conductors of an electric railway, or for the traction-cables of a cable railway, or for both the traction-cables and the supply-conductors where the respective systems (cable and electric) traverse in common the same course or street for a certain distance.

My invention relates, further, to the accommodation of conductors of electricity for the transmission of telegraphic, telephonic, heating, lighting, or power currents, and for the ducts or tubes for pneumatic or hydraulic systems of communication—in short, to a single combined way wherein the manifold systems of intercommunication controlled from a terminal station or stations now in use can be all separately housed with economy to the projectors and safety and convenience to the general public.

The object of this invention is to attain this end by simple means, to produce a structure that will resist as far as possible the destructive action of the soil, and to enable the various parts to be cheaply and readily set in place, and those subjected to wear to be removed without difficulty.

An additional object is to give perfect insulation to such parts as carry the electric currents, and to make their action reliable in all conditions of weather.

To this end my invention consists in a special form of supporting-bracket placed at intervals along the line of the conduit for firmly supporting the various tubular ducts used in the systems adverted to above, as well as cables for traction-roads and electric-supply conductors of improved construction. The novel features of this bracket and its combination with other parts of the conduit will be hereinafter more particularly pointed out in the claims.

My invention also consists in an improved bed for the before-mentioned brackets to prevent them from settling or sinking, and to reduce any liability to fracture or strain which might arise from the shocks of surface traffic.

Furthermore, the invention consists in novel means for locking the car-rails in position, and for rendering their removal and replacement perfectly easy when substitution or repairs are necessary.

My invention embodies, also, an improved means of supporting the railway supply-conductors and their insulators to the walls of the conduit. It comprises, moreover, an improved insulating duct or tube for buried electric wires, and other details of construction, which will be more fully explained hereinafter.

In the accompanying drawings, illustrating my invention, Figure 1 is a perspective view of a single-track conduit, the filling of cement and paving being removed from a portion on the right to illustrate the distribution and structure of the several parts. Fig. 2 is a cross-sectional view of a form of bracket for a double-track conduit, the various parts of the latter being shown in position, the paving being omitted. Fig. 3 is a cross-sectional view of a form of bracket now used in New York city as to slot-rails and braces. Features of my own invention are added, however, to show how a simple conduit could be adapted for both cable and electrical railways. Fig. 4 is a cross-sectional view of a bracket provided with a collector-channel having interior recesses to hold the supply-conductor and its insulation in place. Fig. 5 is a longitudinal view of Fig. 4, taken, respectively, on the lines $x\,x$ and $y\,y$. Figs. 6, 7, 8, 9, and 10 show various forms of insulators, and the way in which they are secured to the sides of the conduit, as well as the manner in which the conductors are affixed to them. Fig. 11 is a detail view showing a simple form of conductor-support. Figs. 12, 13, and 15 show various modifications of the supports for the railway supply-conductors. Fig. 14 is a detail view showing how the supply-conductors are secured to the supporting-brackets. Fig. 16 shows in section a completed tube for housing the different electric wires. Figs. 17 and 18 show in sectional view two distinct types of joints for said tubes. Fig. 19 is an end elevation of Fig. 16.

Like numbers of reference indicate similar parts throughout the figures of the drawings.

In putting my invention into practice a trench of suitable depth is first excavated along the line of way, in the bottom of which are placed, at distances corresponding to the distance between the brackets, the supports or ties 1, which constitute the foundation for the said brackets. These ties are formed of insulating-cement, such as asphaltum, or similar inelastic water-proof non-conducting material; or a concrete of broken stone and cement might be substituted. I have found that such ties make an admirable foundation.

By reason of the oily nature of the asphaltum it refuses to absorb moisture from the neighboring soil. By its inherent insulating properties it guards securely against electric leakage. By its non elastic properties it reduces the chances of breaks, liable to result from the continuous pounding on the rail-joints by the traveling vehicles by deadening the shock, and thus preserves the life of the brackets. To avoid concussion from surface traffic, a layer of sand or coal-tar (see Fig. 1) may be placed between the concrete filling and the paving-blocks 18, inasmuch as the same will to a great degree prevent the roadway from absorbing any moisture, and will greatly relieve the pressure on the slot-rails 5 5, due to the freezing of such moisture.

The brackets are made of a single piece of cast metal, as shown in Fig. 1.

A perforated diaphragm or web, 38, is surrounded peripherally by wide flanges 2, 3, 4, and 6, which, in addition to giving strength to the casting, provides a wide bearing-surface for the track-rails 8 8, slot-rails 5 5, and for the railway supply-conductor 13, as shown.

The brackets may be constructed to any suitable length and width to suit the character of the traffic over the roadway. In any particular case this will become a question for the judgment of the engineer. For a single-track system, I prefer substantially the form shown in Fig. 1, and for a double-track system that shown in Fig. 2. In some cases, however, it may be found convenient to use some portion of a line for both a cable railway as well as for one operated by electricity—as, for example, where an electric railway branches into a street previously occupied by a cable, conduit. In such instance I adopt the forms shown in Figs. 3 and 4, it only being necessary to have the collector-chamber 6 of greater depth to prevent interference of the cables 27 27 with the supply-conductors 13 13.

A cable line provided with my brackets could be readily adapted for electric-railway purposes, or where a cable-conduit structure already exists the sides can be tapped and the supply conductors and supports 12 12 suitably attached thereto, as hereinafter explained, and when the combined service is utilized the conductor-supports 29 29 are secured therein, as shown in Fig. 3; or the sides may be provided with inclined lugs 34, as shown in Fig. 4, into which such insulators as are shown in Figs. 6 and 10 are slipped. The brackets are provided at their center (see Fig. 1) with a slot, through which the depending collector or contact devices can pass. Said slot is made sufficiently wide to permit access of the hand to the conductors 13 13 when the slot-rails are removed, a provision necessary in case of repairs. Each slot-iron 5 and each rail 8 has a bearing on the bracket of one-half of the width of the latter, and is fastened to it by a bolt, 23. (See Fig. 2.) The slot-rails, when seated, incline inwardly toward each other to reduce the exterior width of the opening, and are braced against lateral displacement by screw-threaded tie-rods 7, extending through the slot-rail on one side and the corner of the bracket on the other, the rods being tightened and the width of the slot-opening being adjusted by clamp-nuts 15 15. The central opening, 6, in the bracket is enlarged, as shown in Figs. 1 to 4, and the sides of the chamber have undercut recesses 33 33. (See Fig. 4.)

Along the edges of the bracket-slot are downwardly-projecting lips or flanges 17, which deflect any water or other foreign matter which may enter the chamber, or may flow along the bottom of the slot-rails away from the conductors when the latter are secured in place. Suitable recesses are cast in on the bracket to form a firm seat for the slot-rails. (See Figs. 1 and 2.) The bottom flange of the conduit-opening in the bracket is also curved slightly upward at its central portion, in order to increase the strength of the brackets at that point, and deflect water, &c., away from the center of the conduit-channel.

On the sides of the upper surface of the brackets are undercut transverse recesses (shown in detail in Fig. 14) of a width greater than the base of the track-rail, which in turn is so beveled as to fit snugly in one side of the recess. When the rail is pushed into its seat or recess, a lock-plate, 16, rhombus-shaped in cross-section, is slipped under the opposite recess and bolted to the flange 4 of the bracket. An admirable and adequate rail-fastening is thus secured, which, by virtue of its arrangement, will allow the rail to be readily removed and replaced when necessary. A proper gage of track and non-spreading of rails is likewise secured.

In the web or diaphragmatic part 9 of the bracket are formed circular apertures 10 10 for the admission of the paper ducts or tubes 11 11, (shown in Fig. 1,) which are designed to receive and house the various buried wires, &c. These tubes contain the conductors for telephone, telegraph, electric-lighting, or electric-distribution purposes; or they may be utilized as pneumatic carriers or convey hydraulic power, in which latter instance the tubes would be preferably made of metal. These ducts are placed in position on the brackets, the insulators 12 12 are put in place in the undercut transverse recesses, and a removable conduit core or former (not shown) is then introduced between the brackets. Concrete 14, in a plastic form, is now poured into the spaces between the tubes and around the former or conduit-core, and the sides are thereby shaped, as shown in Fig. 1. When the mass has set sufficiently, the conduit-core is removed and the railway supply-conductors 13 13 are inserted into the insulators 12 12, which are preferably secured against longitudinal movement by the concrete on either side of the bracket. (This refers principally to the form of insulator shown in Fig. 7.) Other means for securing the insulators in position may be employed. The slot-rails 5 5 are then secured in place, the track-rails 8 8 fastened, and the roadway paved, preferably with Belgian blocks, 18.

The filling between brackets is preferably artificial-stone cement.

The various supply-wires protected by the tubes 11 are carried through as the work of laying the conduit proceeds, or may be afterward pulled through by means of any well-known expedient.

When a double-track system is adopted, a form of casting such as shown in Fig. 2 is preferred.

It will be noted from the illustration referred to that the space between the track, as well as that between the rails of each track, is utilized as a conduit for the various types of ducts hereinbefore mentioned.

In Figs. 6 to 10 a variety of modifications of the insulators for the supply-conductors and joints for securing them to the sides of the collector-chamber and to the conductors are illustrated. 43, Fig. 6, is such an insulator. It may be made of terra-cotta, glass, porcelain, or other equivalent material.

13 represents the conductor secured by a tongue-and-groove joint, the said conductor being slipped into the insulator after the latter has been affixed to its bracket.

In Fig. 7 the supply-conductor 13 is slipped over a double outwardly-extending flange, the insulator 42 being secured to the conduit-wall, as in Fig. 9.

Fig. 8 shows another shape of the tongue-and-groove joint, and Fig. 9 shows the same secured to the wall of the collector-chamber.

Fig. 10 shows in detail substantially the same form of insulator 40 and conductor 13 as illustrated in Fig. 2.

Figure 1:
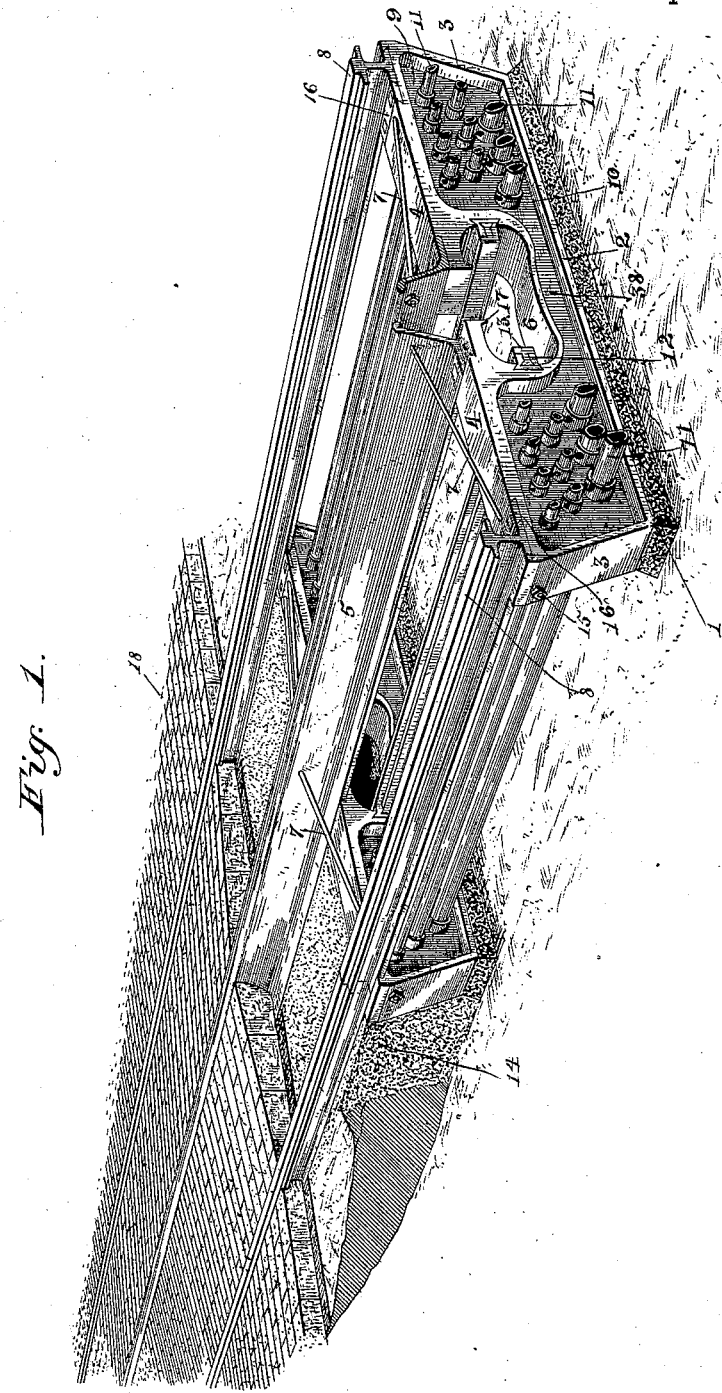

In Figs. 11, 12, 14, 15 are shown different means for supporting the supply-conductors.

In Fig. 11, 85 represents a supporting-pin bolted to the flange of the bracket. Over this pin is slipped a recessed conductor, the recess at that point being lined with insulating material, as shown in Fig. 15.

The support 46 in Fig. 12 is of a curved T shape, over which the correspondingly-grooved conductor 13 must be inserted in a longitudinal direction.

In Fig. 14 the support 82 is shaped as in Fig. 12, but is formed integral with the wall or side of the bracket.

In Fig. 15 an eyebolt, 83, is secured to the flange of the bracket, and the support 84 for the conductor is suitably insulated from the support, as shown.

The paper ducts 11 11, shown in their proper relative positions in the conduit, (see Figs. 1 to 5,) should be strong, of high insulating power, and moisture-proof, so that if the concrete should at any future time absorb moisture they will be able to resist it. These before-mentioned tubes are readily formed by an organization of apparatus, which will not be shown or described herein, inasmuch as the same is designed to form the subject-matter of a separate application.

A section of tube is placed through one of the circular apertures in the web of the bracket, and the end of the adjacent section is nested in the flaring mouth of the other. The joint is then sealed through a suitable perforation (not shown) in the cylindrical flanges 10, with the concrete, 14, used for a filling between the tubes.

At suitable intervals along the conduit are placed drain-pipes opening from the collector-chamber into a sewer or surface-drain below the level of the conduit, so that any water which might fall into the conduit or be introduced by flushing is readily conducted through the said drain-pipes, one of which is shown as 36, Fig. 5.

Having thus described my invention, what I claim as new, and desire to secure by Letters Patent, is—

1. A railway-conduit comprising brackets having a central web and peripheral flange, an interior opening of the same contour as the collector-channel, undercut recesses on the walls of said opening to support supply-conductors, and downwardly-extending drip-flanges at the mouth of said opening in a different vertical plane from the supply-conductors, as specified.

2. The combination, in a railway-conduit, of a bracket having a central web and peripheral flange, an interior opening of the same contour as the collector-channel, undercut recesses on the walls of said opening to support supply-conductors, downwardly-extending drip-flanges at the mouth of said opening in a different vertical plane from the supply-conductors, and suitable bearings in said brackets for the slot and track rails, respectively.

3. A conduit-bracket for a double-track railway, consisting of a single casting with a central web and peripheral flange, and provided with supports for the slot and track rails, an interior opening of the same contour as the collector-chamber, supports in the walls of said opening for supply-conductors, downwardly-extending drip-flanges at the mouth of said opening in a different vertical plane from the supply-conductors, and apertures in the web to admit electric, pneumatic, and other supply tubes.

4. A conduit-bracket consisting of a single casting having a central web and peripheral flange, the web being perforated for the reception of tubular ducts, an interior opening of the same contour as the collector-channel, grooved recesses in the walls of said opening to support the insulators of the supply-conductors, and downwardly-extending drip-flanges at the mouth of said opening in a different vertical plane from the supply-conductors, as specified.

5. A conduit-bracket having an undercut recess on its top face for the track-rails, said recesses being wider than the rail-base, in combination with a rail having one side of its base in one undercut recess, a locking-piece extending into the other undercut recess and overlapping the rail-base, and a bolt securing said locking-piece to the bracket, whereby the rail is securely locked and may be readily removed and replaced.

6. A slotted conduit for railway and general supply system, consisting of brackets at intervals along the line, said brackets having perforated webs within a peripheral flange, insulating-ducts, each supported by one aperture in said webs, transverse foundations of concrete supporting said brackets, and a filling of concrete around the collector-channel and between the ducts for separately insulating and supporting said ducts between the brackets, substantially as described.

7. A slotted conduit for a railway and general supply system, consisting of brackets at intervals along the line, said brackets having an interior opening of the same contour as the collector-channel, supply-conductors secured in the walls of said opening, downwardly-extending drip-flanges in the mouth of the opening out of the plane of the conductors, perforated webs within the peripheries of said brackets, insulating-ducts supported by said webs, and a filling of concrete around the collector-channel and between the ducts, as set forth.

8. The combination, with a supply-conductor for an electric railway, of a slip-joint between said conductor and its support, and the support for said supply-conductor, for the purpose set forth.

9. The combination, with an insulator for the supply-conductors of an electric railway, of a tongue-and-groove joint between said insulator and its support, and the support for the said insulator, for the purpose set forth.

10. The combination of an electric-railway-conduit bracket with an insulator secured thereto by a slip-joint and a supply-conductor secured to the insulator by a similar joint, substantially as described.

11. An underground conduit for electric conductors and general supply system, provided with perforated brackets at intervals along the line, housings for the conductors, consisting of tubes having cup-joints, said joints resting in the brackets, and a filling of insulating-cement between the tubes, substantially as described.

12. A conduit frame or bracket for an electric railway, having an interior opening of the same contour as the collector-channel, and dovetailed recesses in the walls of said opening, within which the insulators of the supply-conductors are supported, substantially as set forth.

13. A metallic conduit frame or bracket for an electric railway, having an interior opening of the same contour as the collector-channel, and dovetailed recesses in the walls of said opening, in combination with the insulators held in position by said recesses and designed to support the supply-conductors, as shown and described.

14. In a conduit for the supply-conductors of an electric railway, the combination, with the dovetailed supporting-brackets having an interior opening of the same contour as the collector-channel, and undercut recesses in the walls of said opening, of dovetailed insulators arranged to be held in position therein, and supply-conductors supported thereby and capable of longitudinal or sliding movement.

15. In an electric-railway conduit, a flanged supporting-bracket having an interior opening conforming in shape to the collector-channel and provided with dovetailed grooves in the walls of said opening for holding the insulators of the supply-conductors, said brackets being also provided upon their upper surface with undercut recesses for the reception of the track and slot rails, respectively, as shown and described.

16. The combination, with the supporting-brackets of an electric or cable railway, having a central web provided with flanged openings, of a series of ducts or tubes passing through said flanged openings formed therein, and a protective body of cement or concrete surrounding said tubes and extending from bracket to bracket, as set forth.

17. The combination, with the metallic supporting-brackets of an electric or cable railway, of self supporting girder-rails secured to the said brackets and partially supported by the cement or concrete located between the same, and the means for securing the said rails, substantially as described.

18. A conduit-bracket for a double-track railway, consisting of a single casting having a peripheral flange and provided with two conduit-openings and with undercut recesses or bearings for the flanges of the track-rails, substantially as described.

19. A conduit-bracket for an electric railway, having a central opening and containing supports for the supply-conductors, inclined slot-rails secured to said bracket and separated to form the surface-slot, and downwardly-extending drip-flanges formed integral with the bracket at or near the base of support of said slot-rails, substantially as described.

20. The combination, with the conduit-brackets having perforated webs for the reception of tubes or ducts, of the conduit-tubes made of paper and coated with an insulating moisture-proof material, and the filling of concrete between said brackets and tubes, substantially as specified.

21. A compressed paper tube impregnated with asphalt and having its ends reduced in thickness, in combination with a short connecting-tube or cup-joint adapted to fit into or over the ends of such tubes and overlap them on both sides of the joint, having the said sealed joints within the flanges of the supporting-brackets, and the flanged supporting-brackets, substantially as described.

22. In a combined electric and traction railway conduit, a bracket having an interior opening of sufficient depth to contain in different horizontal planes the electric supply-conductors and the traction-cables, substantially as and for the purpose set forth.

23. In a combined electric and traction railway, a conduit comprising brackets placed at intervals along the line of way, each of said brackets having an interior opening of the same contour as the collector-channel and of sufficient depth to contain in different horizontal planes the electric supply-conductors and traction-cables, and a concrete filling between said brackets and around the collector-channel, the said collector-channel being of the same depth as the interior openings of the brackets, substantially as and for the purpose set forth.

In testimony whereof I affix my signature in presence of two witnesses.

ELIAS E. RIES.

Witnesses:
GEO. H. TICHENOR,
E. L. WHITE.